US010922972B2

United States Patent
Max et al.

(10) Patent No.: US 10,922,972 B2
(45) Date of Patent: Feb. 16, 2021

(54) METHOD AND DEVICE FOR COLLECTING TRANSPORTATION VEHICLE-BASED DATA RECORDS FOR PREDETERMINED ROUTE SECTIONS

(71) Applicants: VOLKSWAGEN AKTIENGESELLSCHAFT, Wolfsburg (DE); AUDI AG, Ingolstadt (DE)

(72) Inventors: Stephan Max, Gifhorn (DE); Edson William Fangwa Nzeya, Böhmfeld (DE)

(73) Assignees: Volkswagen Aktiengesellschaft; Audi AG

( * ) Notice: Subject to any disclaimer, the term of this patent is extended or adjusted under 35 U.S.C. 154(b) by 0 days.

(21) Appl. No.: 16/674,626

(22) Filed: Nov. 5, 2019

(65) Prior Publication Data
US 2020/0143680 A1    May 7, 2020

(30) Foreign Application Priority Data
Nov. 7, 2018 (DE) .......................... 10 2018 008 730

(51) Int. Cl.
*G08G 1/13* (2006.01)
*H04L 29/08* (2006.01)
*G07C 5/00* (2006.01)

(52) U.S. Cl.
CPC ............... *G08G 1/13* (2013.01); *G07C 5/008* (2013.01); *H04L 67/12* (2013.01)

(58) Field of Classification Search
CPC ....................................................... G08G 1/01
See application file for complete search history.

(56) References Cited

U.S. PATENT DOCUMENTS

2007/0223702 A1    9/2007 Tengler et al.
2009/0125522 A1*   5/2009 Kodama ............... H04L 9/0891
(Continued)

FOREIGN PATENT DOCUMENTS

DE    102011106295 A1    1/2012
DE    102013205392 A1    10/2014
(Continued)

OTHER PUBLICATIONS

Spacey, John; What is a Hashcode?; Oct. 19, 2016; Simplicable; p. 1 (Year: 2016).*

Primary Examiner — Nabil H Syed
Assistant Examiner — Cal J Eustaquio
(74) Attorney, Agent, or Firm — Barnes and Thornburg LLP

(57) ABSTRACT

A method and a device for transmitting vehicle-based environment data of a transportation vehicle travelling on a predetermined section of a road to a backend device for collecting data records relating to the specified section of the road, wherein the backend includes a master data backend and a vehicle data backend that are independent of each other, including registration of the transportation vehicle with the actual vehicle identification number with the master data backend via a wireless communication, transmitting a pseudo-vehicle identification number that is different from the actual vehicle identification number to the transportation vehicle on the part of the master data backend, wherein the allocation of the pseudo-vehicle identification number to the actual vehicle identification number is known outside the transportation vehicle exclusively to the master data backend, and submitting data records or summaries of data records to the vehicle data backend using the pseudo-vehicle identification number exclusively.

16 Claims, 1 Drawing Sheet

(56) References Cited

U.S. PATENT DOCUMENTS

| | | | | |
|---|---|---|---|---|
| 2016/0293000 A1* | 10/2016 | Torgerson | ............... | H04W 4/14 |
| 2017/0103587 A1* | 4/2017 | Oberschachtsiek | .... | G07C 5/008 |
| 2017/0244565 A1* | 8/2017 | Bronk | ................... | H04L 63/126 |

FOREIGN PATENT DOCUMENTS

| | | | |
|---|---|---|---|
| DE | 102014206545 | A1 | 10/2015 |
| JP | 2016058044 | A | 4/2016 |

\* cited by examiner

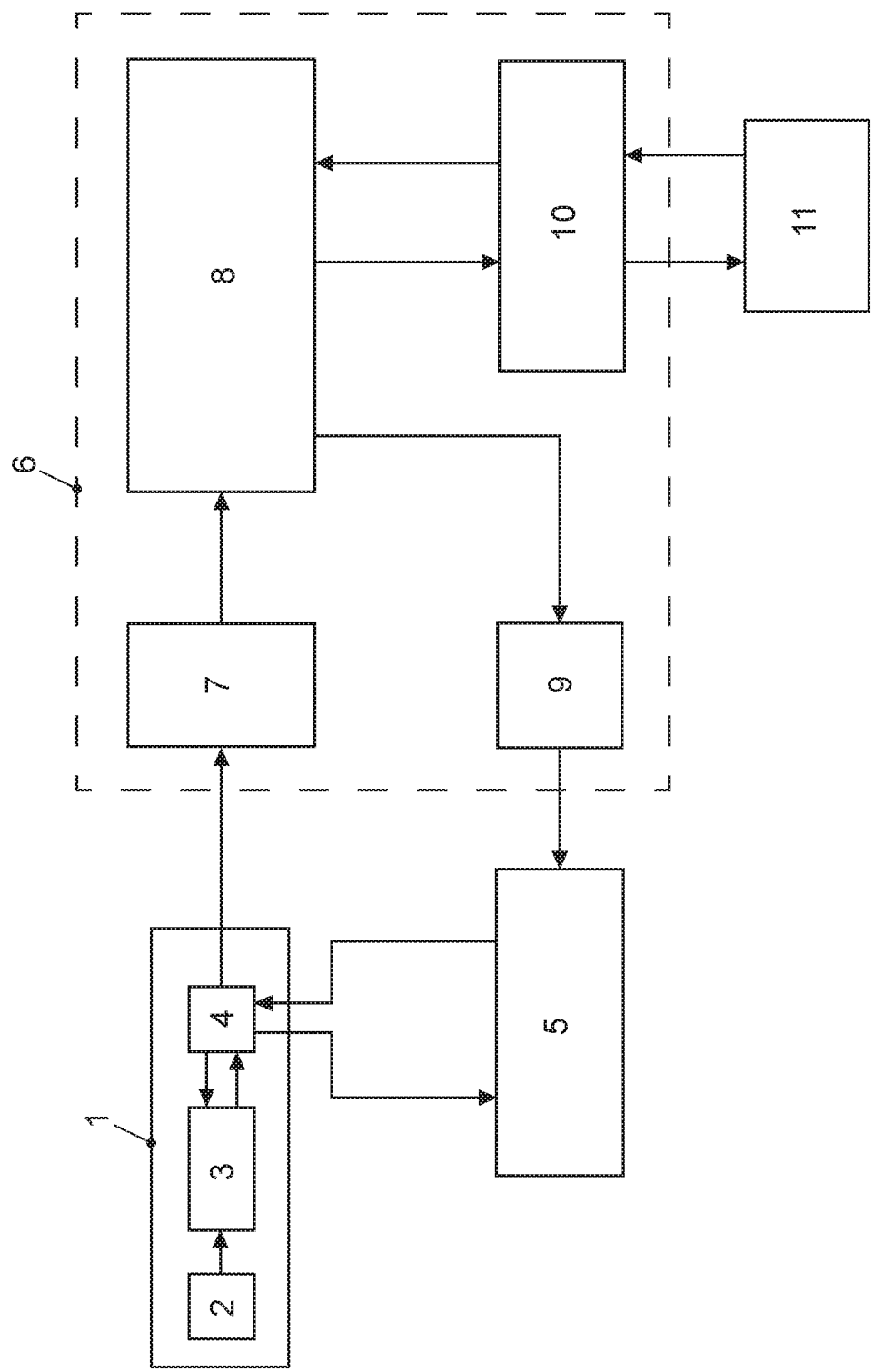

METHOD AND DEVICE FOR COLLECTING TRANSPORTATION VEHICLE-BASED DATA RECORDS FOR PREDETERMINED ROUTE SECTIONS

PRIORITY CLAIM

This patent application claims priority to German Patent Application No. 10 2018 008 730.2, filed 7 Nov. 2018, the disclosure of which is incorporated herein by reference in its entirety.

SUMMARY

Illustrative embodiments relate to a method for transmitting transportation vehicle-based data to a backend computer, referred to as a backend, for the collection of data records related to predetermined route sections as well as a corresponding device.

BRIEF DESCRIPTION OF THE DRAWINGS

A disclosed embodiment is explained below based on the drawing. In the FIGURE:

FIG. 1 shows the device for the generation of data records about predetermined route sections in a schematic representation.

DETAILED DESCRIPTION

In recent years, a wide range of interactive electric series systems have been developed to support the driver. The integrated assistance and comfort systems use various sensors to measure the environment of the transportation vehicle to make the journey safer and more comfortable, thus generating up-to-date data on the environment currently being traversed.

Since the transportation vehicles are already equipped with various sensor systems, it makes sense to collect this data and use it across the board. This trend is reinforced by two changed framework conditions. On the one hand, previously offered optional systems have become standard equipment due to the ever-increasing safety requirements of, for example, NCAP (NCAP: New Car Assessment Program, or the European New Car Assessment Program). On the other hand, the compulsion to use the electronic emergency call system, also known as eCall, requires mobile phone connections in the transportation vehicle by law. Therefore, the environment data can be collected and communicated directly in a location-related and time-synchronized manner.

Different data classes are recorded in the transportation vehicle itself. As far as the environment is concerned, the data are subdivided as follows:
  geoinformation relating to geographical phenomena directly and indirectly linked to a position relative to the Earth,
  traffic data, i.e., a description of the conditions of all objects involved in traffic,
  location-related event data, such as local hazard points that occur on a point-by-point basis, and
  location-related status data, i.e., continuously recordable data such as temperature, parking space occupancy, traffic light status, variable traffic signs, etc.

In previous systems for the determination of swarm data, however, in most cases the data are simply forwarded from the transportation vehicle directly to the backend, wherein the determined data packets are recorded in the transportation vehicle and sent to the backend without modification. Intelligent processing is usually not done. Furthermore, the data transmitted to the backend may allow conclusions to be drawn about the data-collecting transportation vehicles, since anonymization of the transmitted data is not necessarily guaranteed in accordance with the data protection regulations and thus the privacy of the data transportation vehicle user is not protected.

Document DE 10 2011 106 295 A1 concerns a method for the bi-directional transfer of data between transportation vehicles and a service provider, with the provision of information data via a data infrastructure cloud that can be received by the transportation vehicles and originated by the service provider and the provision of traffic data describing a traffic condition and originating from transportation vehicles. To enable the secure bi-directional transfer of the data, an exclusive provision of the traffic data to the service provider via a backend server device operated by a security operator is provided. A bi-directional transfer of data from the transportation vehicle to several providers takes place, wherein the transportation vehicle obtains data from the backend, such as traffic flow data, and responds with data of its own that describe the current traffic situation, for example. When the data are passed in the reverse direction, a security backend is interposed, which carries out identification of the transportation vehicle and may be able to forward the data anonymously.

Document DE 10 2013 205 392 A1 concerns a backend device for providing information for driver assistance functions of transportation vehicles, which comprises a plurality of application units, a database and an interface unit. The application units are each set up to provide information for at least one driver assistance function of the transportation vehicle for transmission to the transportation vehicles. The database stores information from an environment model. The interface unit is assigned to the database and provides access to information stored in the database, wherein the application units are each connected to the interface unit to call up information stored in the database via the interface unit.

Document DE 10 2014 206 545 A1 describes a method of transmitting data between at least one data access node, in particular, a transportation vehicle antenna, of a transportation vehicle and at least one terminal that is external to the transportation vehicle, wherein data to be sent from the transportation vehicle are at least partially anonymized before being passed on. Furthermore, the document describes a communication system and a data access node for transmitting data, wherein the identity of the transportation vehicle can be inferred from the data.

Disclosed embodiments provide a method for transmitting transportation vehicle-based data to a backend for the generation of route-based data records and a corresponding device, wherein drawing conclusions from the transmitted and collected data records regarding the private sphere of the drivers of the transportation vehicle collecting the data is impossible or at least made more difficult.

The disclosed method for transmitting transportation vehicle-based environment data of a transportation vehicle traversing a predetermined section of the road to a backend for raising data records relevant to the specified road section, wherein the backend includes a master data backend and a transportation vehicle data backend that are designed and set up independently of each other, includes:
  registering the transportation vehicle with the actual transportation vehicle identification number thereof with the master data backend via wireless communication, transmitting a pseudo-vehicle identification number that is different from the actual transportation vehicle identification number to the transportation vehicle by the master data backend, wherein the allocation of the pseudo-vehicle identification number to the actual transportation vehicle identification number is known only to the master data backend outside the transportation vehicle, submitting data records or summaries of data records, so-called headers, to the transportation vehicle data backend using the pseudo-vehicle identification number exclusively.

Because the backend consists of two independent units and only the master data backend knows the actual identity of the individual transportation vehicles, wherein the actual identity is not known to the data-collecting transportation vehicle data backend, the privacy of the transportation vehicles can be protected.

Optionally, the pseudo-vehicle identification number is generated from the transportation vehicle identification number by a hash function. In this way, the transportation vehicle identification number can always be precisely transferred to the pseudo-vehicle identification number, which does not apply to the reverse direction, so that the pseudo-vehicle identification number can be used in the method without endangering the privacy of the transportation vehicle.

Optionally, the assignment of the pseudo-vehicle identification number to the actual transportation vehicle identification number is changed at predetermined time intervals. In this case, the predetermined time interval can be one day, half a day, or at least 1 hour.

Further the assignment of the pseudo-vehicle identification number to the actual transportation vehicle identification number may be changed at random time intervals. In this case, the random time interval may be at least 1 hour.

Changing the assignment of the pseudo-vehicle identification number to the actual transportation vehicle identification number, i.e., changing the pseudo-vehicle identification numbers at predetermined or random time intervals, will improve the security of the sphere of privacy of the transportation vehicle or driver.

Also optionally, the transportation vehicle generates data about the surroundings with the environment sensors, summarizes the data into a current data record concerning the predetermined route section as a function of the recording time in a data aggregator and generates a header related to the current data record, which is transferred together with the pseudo-vehicle identification number to the transportation vehicle data backend, where as a function of the header it is decided whether the corresponding data record is requested by the transportation vehicle data backend or not. In this way it is ensured that the transmission path from the transportation vehicle to the transportation vehicle data backend is used effectively and that bandwidth is kept as low as possible.

Also optionally, the request for the data record from the transportation vehicle data backend is made using the pseudo-vehicle identification number, which is fed to the master data backend with the request. The master data backend, which is aware of the assignment of the pseudo-vehicle identification number to the transportation vehicle identification number, prompts the transportation vehicle, using the transportation vehicle identification number, to send the requested data record to the transportation vehicle data backend, wherein this transmission from the transportation vehicle to the transportation vehicle data backend is again carried out using the pseudo-vehicle identification number. In this way it is ensured that the transportation vehicle data backend is not aware of the actual transportation vehicle identification number.

Optionally, the request for a data record relating to a predetermined section of the route is made by a customer who communicates with the transportation vehicle data backend exclusively via an interface. In this way, the customer may at most be in possession of the pseudo-vehicle identification number and not in possession of the transportation vehicle identification number.

Optionally, the customer determines the measurement parameters of the data record concerning a given section of the route, so that the transportation vehicle data backend can determine on the basis of the headers supplied by the transportation vehicle or transportation vehicles whether corresponding data records are available and can be retrieved from the transportation vehicle or transportation vehicles and made available to the customer.

The disclosed device for transmitting transportation vehicle-based environment data of a transportation vehicle travelling on a predetermined road section to a backend for collecting data records relating to the specified road section, wherein the device is set up and configured for the implementation of the method described above, includes:

at least one transportation vehicle with an environment sensor arrangement, a data aggregator and a communication device, a master data backend that generates a pseudo-vehicle identification number as a function of the actual transportation vehicle identification number of the transportation vehicle and feeds it to the transportation vehicle, a transportation vehicle data backend with which the transportation vehicle communicates exclusively with the pseudo-vehicle identification number, wherein the transportation vehicle data backend comprises a communication device for communication with the transportation vehicle or transportation vehicles, a data handling device for processing the headers and data records of the transportation vehicle or transportation vehicles, a data request device for requesting data records via the master data backend and an interface for communication with a customer.

The so-called "poison cabinet" concept described above for the protection of the sphere of privacy of the driver provides for an organizational and physical separation of the backend computer with the following principle.

Only the master data backend, also referred to as the MBB, knows the complete identity of the customer transportation vehicle as well as the equipment of the transportation vehicle. The task of the master data backend MBB is to purposefully send the measurement orders to the customer transportation vehicle and to transmit a pseudo-vehicle identification number to the transportation vehicle. However, the MBB will not receive any data of the transportation vehicle.

The transportation vehicle data backend, also known as the ACDC for "Automotive Cloud Data Collector", receives the data determined by the transportation vehicle—but only under the pseudonym of the pseudo-vehicle identification number—and processes the collected transportation vehicle data for forwarding.

In this way, it is not possible to draw conclusions about the identity of the data-generating transportation vehicle within the ACDC with the existing data or the data records transmitted to the provider.

FIG. 1 shows in a schematic representation the device for transmitting transportation vehicle-based data to a backend computer for generating data records. A transportation vehicle 1 is travelling on a current section of the route and is using a suitable sensor arrangement 2 to generate environment data for the relevant section of the route on which the transportation vehicle is currently located. The data generated by the sensor arrangement 2 for the section of the route currently being used is fed to a data aggregator 3 of the transportation vehicle 1, which summarizes the data into data records on the one hand and, on the other hand produces a summary, a so-called header, for each data record generated. Furthermore, the transportation vehicle 1 comprises a communication device 4, by which the transportation vehicle 1 communicates wirelessly with external devices.

In the example of FIG. 1, the communication device 4 of the transportation vehicle 1 communicates bidirectionally with a master data backend 5, which knows the complete identity of the transportation vehicle 1 and its equipment. Thus, the transportation vehicle 1 with its transportation vehicle identification number, VIN for short, registers with the master data backend 5 via a radio connection when the transportation vehicle is commissioned, so that the master data backend 5 can communicate with the transportation vehicle 1. Furthermore, the master data backend 5 assigns a virtual or pseudo-vehicle identification number, or PVIN, to the transportation vehicle 1 that the transportation vehicle 1 will use to transmit measured data records to other instances. In other words, only the master data backend 5 knows the actual transportation vehicle identification number VIN of the transportation vehicle 1.

The transportation vehicle 1 also communicates in a one-sided manner with the transportation vehicle data backend 6 by sending summaries of the measured data records for a given section of the route, so-called headers, on the one hand or by sending complete data records of a predetermined section of the route on request from the master data backend 5 on the other hand, wherein both the headers transferred to the transportation vehicle data backend 6 and the complete data records only have the pseudo-vehicle identification number PVIN in addition to identification characteristics such as time stamps and route identification. The actual transportation vehicle identification number VIN does not appear in the communication of the headers or the complete data records to the transportation vehicle data backend 6.

In FIG. 1, the transportation vehicle data backend 6 includes multiple subsections. Thus, the data transmitted by the transportation vehicle 1 are received by a communication device 7 of the transportation vehicle data backend 6 via a wireless communication connection, wherein in the communication device 7 processing of the received data takes place in a format that can be processed in the data handling 8 of the transportation vehicle data backend 6. Furthermore, the transportation vehicle data backend 6 includes a data request device 9, which instructs the master data backend 5 to request the transportation vehicle 1 to transfer complete data records to the transportation vehicle data backend 6. Furthermore, the transportation vehicle data backend 6 comprises an interface 10, which enables bi-directional communication with a client or customer 11.

A typical exemplary procedure of the method for determining route-related data is as follows: the transportation vehicle 1 uses the sensor arrangement 2 thereof to measure data about the current environment while travelling on a section of the route, for example, the aforementioned environment data such as geoinformation, traffic data, location-related event data and/or location-related state data that are aggregated by a data aggregator 3 and stored in data records of the transportation vehicle 1. Furthermore, in the data aggregator 3 of the transportation vehicle 1, a summary of each data record is carried out to form a header. This header is continuously transmitted by the communication device 4 of the transportation vehicle 1 to the communication device 7 of the transportation vehicle data backend 6, is transformed there into a suitable format and is fed to the data handling 8 for further processing and storage. The transportation vehicle transmitting the header 1 identifies itself to the transportation vehicle data backend 6 exclusively by its virtual or pseudo-vehicle identification number PVIN.

A client or customer 11 passes an instruction via the interface 10 of the transportation vehicle data backend 6 to collect environment data from one or more specified sections of a road or motorway, wherein it is possible to specify further boundary conditions, such as, for example, the number of measurements per section of the route and/or the desired measurement time intervals. These requirements are passed on to the data handling 8 of the transportation vehicle data backend 6, which uses the database thereof to check whether the desired data records may be present in a transportation vehicle that is currently travelling on the sections of the route desired by the customer 11, for example, the transportation vehicle 1 mentioned in FIG. 1.

If the data handling 8 of the transportation vehicle data backend 6 has detected that there are 1 data records in the transportation vehicle that meet the requirements of the customer 11 on the basis of the present header of the transportation vehicle 1, the data handling 8 commissions the data request 9 with the procurement of the entire data records available in the transportation vehicle 1.

As a result, the data request 9 commissions the master data backend 5 to obtain this data and transmits the pseudo-vehicle identification number PVIN to the master data backend 5, since the actual transportation vehicle identification number VIN is not known to the transportation vehicle data backend 6.

Due to the assignment for data acquisition on the part of the data request 9, the master data backend 5 uses the pseudo-vehicle identification number PVIN to determine the actual transportation vehicle identification number VIN and causes the communication device 4 of the transportation vehicle 1 to transmit the complete data records belonging to the header or headers to the communication device 7 of the transportation vehicle data backend 6.

In the handling device 8, the requested data records are processed suitably for the customer 11 and forwarded to the customer 11 via the interface 10. To protect the privacy of the transportation vehicle 1, the data records can be masked even further in the handling device 8, for example, by the transferred data records being obfuscated spatially and/or temporally.

Since the transportation vehicle data backend 6 does not know the actual transportation vehicle identification number VIN and, if necessary, further obfuscation of the data records transmitted to the customer 11 is carried out, it is hardly possible or it is impossible for the customer 11 to draw conclusions about the transportation vehicle 1 from the transmitted data records, so that the privacy of the transportation vehicle 1 is guaranteed in terms of data law.

To increase security, it is also possible that a change of the pseudo-vehicle identification number PVIN is made on the part of the master data backend 5 at predetermined or random time intervals. For example, an hourly or daily change of the pseudo-vehicle identification number PVIN can be used as a predetermined time interval. For example, in the event of a random change of the pseudo-vehicle identification number, a minimum time interval of 1 hour can be set.

Furthermore, the pseudo-vehicle identification number used may be generated from the transportation vehicle identification number by a hash function. In this way, the transportation vehicle identification number can always be translated to the pseudo-vehicle identification number, which does not apply to the reverse direction.

REFERENCE CHARACTER LIST

1 Transportation vehicle
2 Sensor arrangement
3 Data aggregator of the transportation vehicle
4 Communication device
5 Master data backend
6 Transportation vehicle data backend
7 Communication device
8 Data handling of transportation vehicle data backend
9 Data request device
10 Interface between transportation vehicle data backend and customer
11 Customer/user

The invention claimed is:

1. A device for transmitting vehicle-based environment data of a transportation vehicle travelling on a predetermined section of road to a backend device for collecting data records relating to the specified section of the road, wherein the device comprises:
   a transportation vehicle environment sensor arrangement;
   a transportation vehicle data aggregator; and
   a transportation vehicle communication device,
   wherein a master data backend that generates a pseudo-vehicle identification number as a function of the actual transportation vehicle identification number of the transportation vehicle feeds the pseudo-vehicle identification number to the transportation vehicle that includes the device,
   wherein a transportation vehicle data backend with which the transportation vehicle communicates exclusively with the pseudo-vehicle identification number, wherein the transportation vehicle data backend includes a communication device for communication with the transportation vehicle or transportation vehicles, a data handling device for processing the headers and data records of the transportation vehicle, a data request device for requesting data records via the master data backend, and an interface for communication with a customer
   wherein the pseudo vehicle identification number is generated by application of a hash function to the transportation vehicle identification number so as to mask the actual transportation vehicle identification number in the master data backend and;
   wherein the assignment of the pseudo-vehicle identification number to the actual transportation vehicle identification number is changed at predetermined time intervals.

2. The device of claim 1, wherein the predetermined time interval is one day, half a day or at least 1 hour.

3. The device of claim 1, wherein the assignment of the pseudo-vehicle identification number to the actual transportation vehicle identification number is changed at random time intervals.

4. The device of claim 3, wherein the random time interval is at least 1 hour.

5. The device of claim 1, wherein the transportation vehicle with the environment sensor arrangement generates data for the surroundings, summarizes the data into a current data record concerning the given route section as a function of the recording time in a data aggregator and generates a header related to the current data record, which is transferred together with the pseudo-vehicle identification number to the transportation vehicle data backend, where it is decided as a function of the header whether or not the corresponding data record is requested by the transportation vehicle data backend.

6. The device of claim 5, wherein the request of the data record from the transportation vehicle data backend is fed to the master data backend using the pseudo-vehicle identification number, and the master data backend requests the transportation vehicle to transmit the requested data record to the transportation vehicle data backend using the transportation vehicle identification number, wherein this transmission to the transportation vehicle data backend is carried out using the pseudo-vehicle identification number.

7. The device of claim 6, wherein the request for data records relating to a specified section of the route is made by a customer that communicates with the transportation vehicle data backend exclusively via an interface.

8. The device of claim 7, wherein the customer determines the measurement parameters of the data record concerning a given section of the route, so that the transportation vehicle data backend determines whether corresponding data records are retrieved from the transportation vehicle or transportation vehicles and made available to the customer based on the headers supplied by the transportation vehicle or transportation vehicles.

9. A method for transmitting transportation vehicle-based environment data of a transportation vehicle travelling on a predetermined section of road to a backend device for collecting data records relating to the specified section of the road, wherein the backend device includes a master data backend and a transportation vehicle data backend that are independent of each other, the method comprising:
   registering the transportation vehicle with the actual transportation vehicle identification number with the master data backend via a wireless communication;
   transmitting a pseudo-vehicle identification number that is different from the actual transportation vehicle identification number to the transportation vehicle on the part of the master data backend, wherein the assignment of the pseudo-vehicle identification number to the actual transportation vehicle identification number is known outside the transportation vehicle exclusively to the master data backend; and
   submitting data records or summaries of data records, so-called headers, to the transportation vehicle data backend using the pseudo-vehicle identification number exclusively
   wherein the pseudo vehicle identification number is generated by application of a hash function to the transportation vehicle identification number so as to mask the actual transportation vehicle identification number in the master data backend and;
   wherein the assignment of the pseudo-vehicle identification number to the actual transportation vehicle identification number is changed at predetermined time intervals.

10. The method of claim 9, wherein the predetermined time interval is one day, half a day or at least 1 hour.

11. The method of claim 9, wherein the assignment of the pseudo-vehicle identification number to the actual transportation vehicle identification number is changed at random time intervals.

12. The method of claim 11, wherein the random time interval is at least 1 hour.

13. The method of claim 9, wherein the transportation vehicle with the environment sensor arrangement generates data for the surroundings, summarizes the data into a current data record concerning the given route section as a function of the recording time in a data aggregator and generates a header related to the current data record, which is transferred together with the pseudo-vehicle identification number to the transportation vehicle data backend, where it is decided as a function of the header whether or not the corresponding data record is requested by the transportation vehicle data backend.

14. The method of claim 13, wherein the request of the data record from the transportation vehicle data backend is fed to the master data backend using the pseudo-vehicle identification number, and the master data backend requests the transportation vehicle to transmit the requested data record to the transportation vehicle data backend using the transportation vehicle identification number, wherein this transmission to the transportation vehicle data backend is carried out using the pseudo-vehicle identification number.

15. The method of claim 13, wherein the request for data records relating to a specified section of the route is made by a customer that communicates with the transportation vehicle data backend exclusively via an interface.

16. The method of claim 15, wherein the customer determines the measurement parameters of the data record concerning a given section of the route, so that the transportation vehicle data backend determines whether corresponding data records are retrieved from the transportation vehicle or transportation vehicles and made available to the customer based on the headers supplied by the transportation vehicle or transportation vehicles.

* * * * *